(12) United States Patent
Harrington

(10) Patent No.: US 7,922,855 B2
(45) Date of Patent: Apr. 12, 2011

(54) METHOD FOR GUIDING EVERTING FORM EMPLOYED TO CARRY REPAIR MATERIAL INTO PIPE OR CONDUIT

(75) Inventor: David R. Harrington, Upper Beaconsfield (AU)

(73) Assignee: Sideliner Enterprises Pty Ltd. (AU)

( * ) Notice: Subject to any disclaimer, the term of this patent is extended or adjusted under 35 U.S.C. 154(b) by 1146 days.

(21) Appl. No.: 10/499,377

(22) PCT Filed: Jun. 17, 2003

(86) PCT No.: PCT/AU03/00756
§ 371 (c)(1),
(2), (4) Date: Jun. 16, 2004

(87) PCT Pub. No.: WO03/106881
PCT Pub. Date: Dec. 24, 2003

(65) Prior Publication Data
US 2005/0072482 A1    Apr. 7, 2005

(30) Foreign Application Priority Data

Jun. 18, 2002   (AU) .................................... 48831/02

(51) Int. Cl.
*B29C 63/28*     (2006.01)
*B29C 63/36*     (2006.01)
*F16L 55/16*     (2006.01)
*F16L 55/165*    (2006.01)
*F16L 55/18*     (2006.01)

(52) U.S. Cl. ............ 156/247; 138/97; 138/98; 156/287; 156/423; 264/269

(58) Field of Classification Search .................. 156/247, 156/287, 423; 264/269; 138/97, 98
See application file for complete search history.

(56) References Cited

U.S. PATENT DOCUMENTS 3,880,058 A * 4/1975 Ichioka ......................... 493/480
(Continued)

FOREIGN PATENT DOCUMENTS

EP          0919762 A1     6/1999
(Continued)

*Primary Examiner* — Steven D Maki
(74) *Attorney, Agent, or Firm* — Edmonds & Nolte, P.C.

(57) ABSTRACT

A method and apparatus for guiding an everting form employed to carry formed-in-situ repair material into a pipe or conduit comprising passing a guiding means through the interior and along the full length of the everting form in its un-everted state; fixing a first end of the guiding means to a substantially closed end of the everting form; attaching the guiding means in a readily detachable way to the interior surfaces of the everting form and the repair material substantially throughout the length of the everting form; and, during eversion of the everting form, applying tension to the guiding means to assist in guiding the transition of the zone of eversion through directional changes and discontinuities in the pipe or conduit and prevent localised axial differential movement between the everting form and the repair material immediately upstream of the zone of eversion.

13 Claims, 3 Drawing Sheets

U.S. PATENT DOCUMENTS

| | | | |
|---|---|---|---|
| 4,334,943 A * | 6/1982 | Zenbayashi et al. | 156/287 |
| 4,576,205 A * | 3/1986 | Morinaga et al. | 156/287 |
| 4,581,085 A * | 4/1986 | Wood | 156/287 |
| 4,602,974 A * | 7/1986 | Wood et al. | 156/287 |
| 4,778,553 A * | 10/1988 | Wood | 156/287 |
| 5,034,180 A | 7/1991 | Steketee, Jr. | |
| 5,108,533 A * | 4/1992 | Long et al. | 156/294 |
| 5,388,616 A | 2/1995 | Muller et al. | |
| 5,855,729 A * | 1/1999 | Kiest et al. | 156/423 |
| 6,053,211 A * | 4/2000 | Schwert et al. | 156/294 |
| 6,619,886 B1 * | 9/2003 | Harrington | 156/287 |

FOREIGN PATENT DOCUMENTS

| | | | |
|---|---|---|---|
| GB | 2 188 695 A | | 3/1986 |
| JP | 62-121034 | * | 6/1987 |
| JP | 03-197022 | * | 8/1991 |
| WO | WO 99/28668 | * | 6/1999 |

* cited by examiner

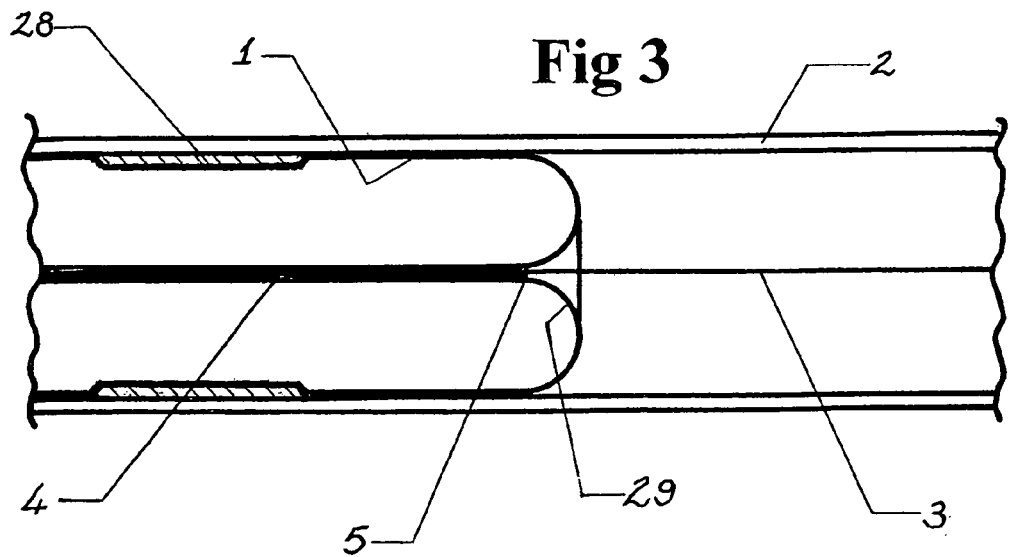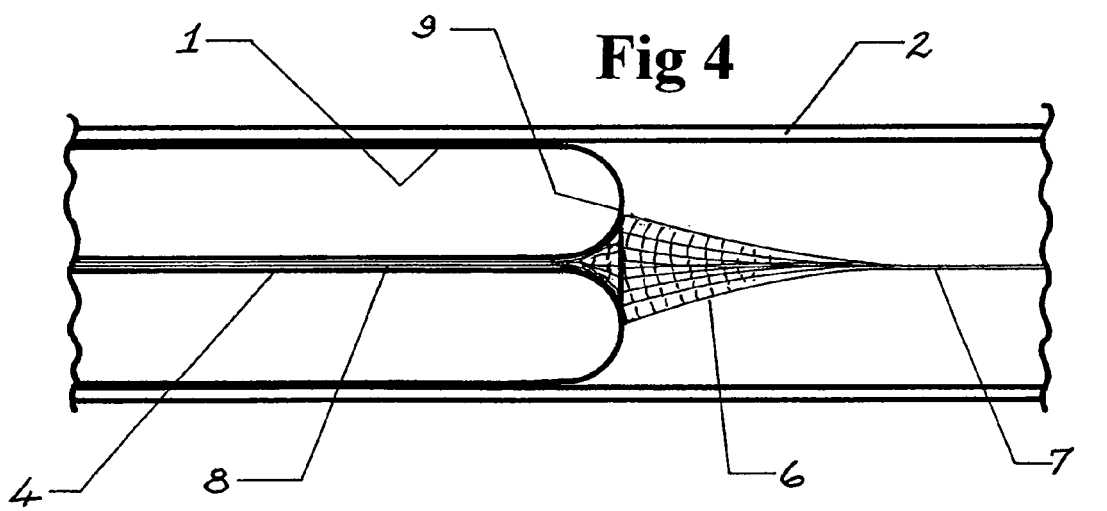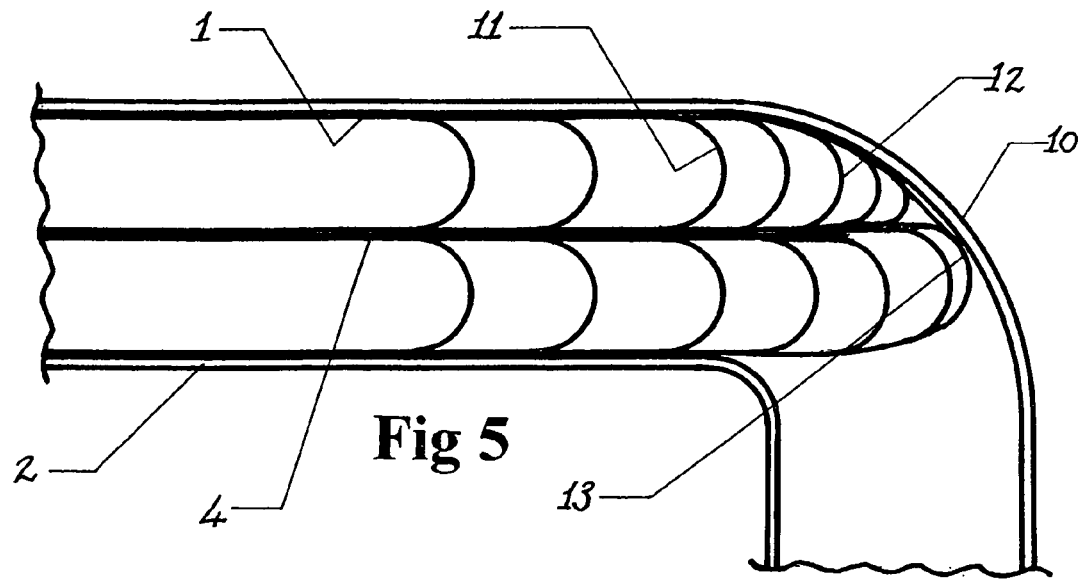

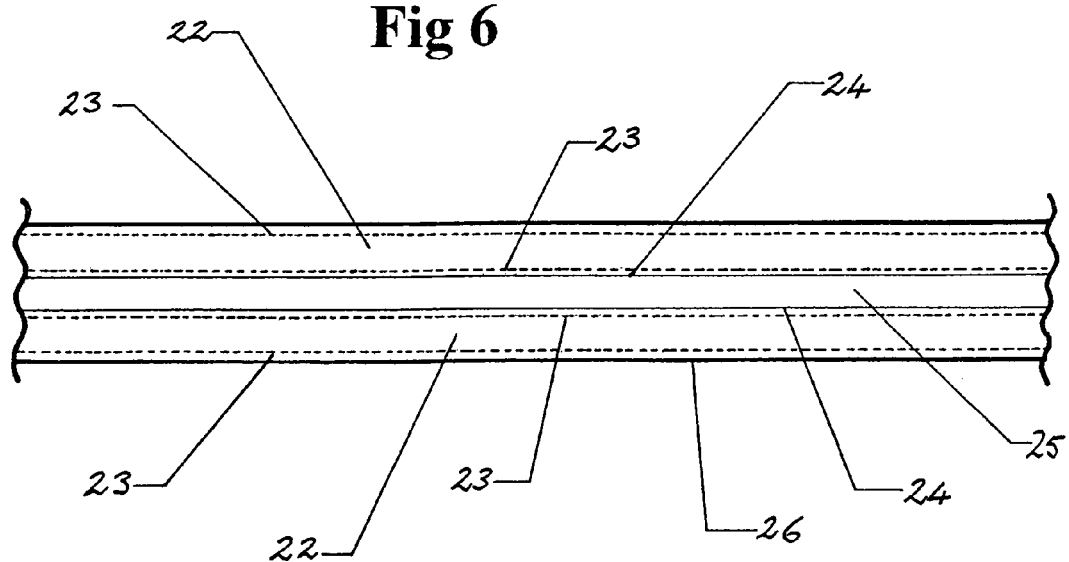
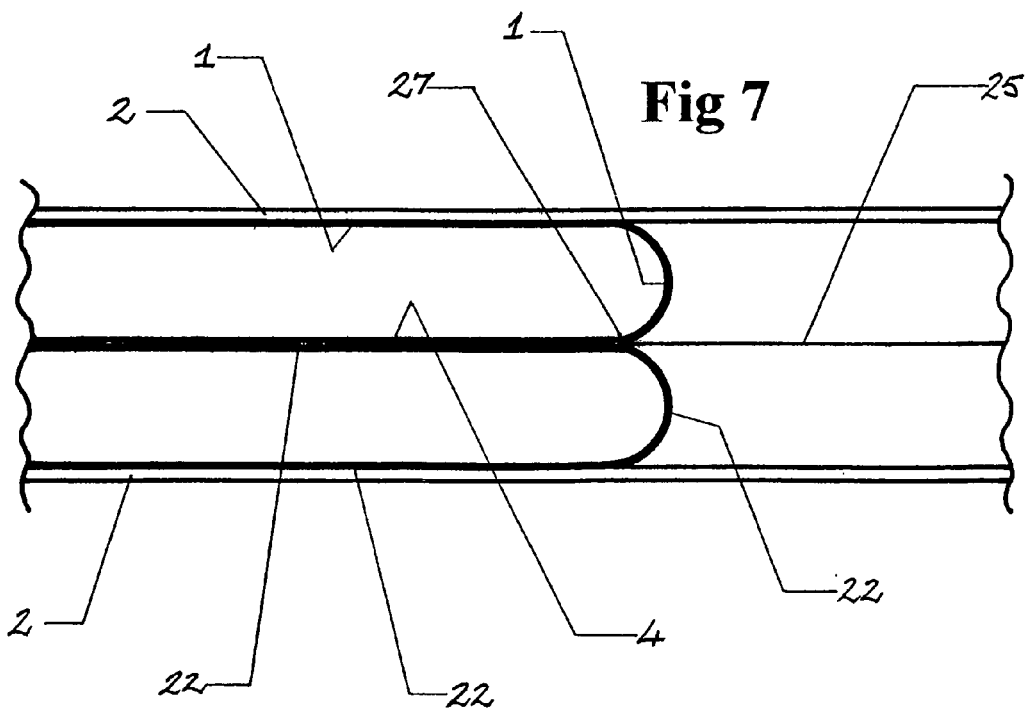

METHOD FOR GUIDING EVERTING FORM EMPLOYED TO CARRY REPAIR MATERIAL INTO PIPE OR CONDUIT

CROSS-REFERENCE TO PCT CASE

This is a National Stage application under 35 USC 371 of PCT/AUY03/00756, filed 17 Jun. 2003, and based on Australian Patent Application No. AU 48831/02, filed on Jun. 18, 2002.

FIELD OF INVENTION

This invention relates to improvements in methods and apparatus for the installation of formed-in-situ repairs in pipes and conduits. In particular, it relates to methods in which suitably shaped, fibrous, woven or knitted repair material impregnated with a settable resin are carried into place within a pipe or conduit to be repaired by a progressively everting form, with the everted part kept in an inflated state to maintain the repair material in intimate contact with the inner surface of the pipe or conduit until the settable resin is cured.

BACKGROUND OF INVENTION

Eversion methods for lining pipes and conduits with a hardenable resin perimeter material are known. The problem with conventional methods of eversion lining is that while they are known to employ tow cables to assist in drawing liner material into place in a pipe or conduit, they do not employ means to guide the zone of eversion through large, sharp directional changes or changes in diameter or alignment.

PCT Patent Application No. PCT/AU98/00988 teaches a method of installing a formed-in-situ repair in a pipe or conduit through the use of a progressively everting form to carry into place within the pipe or conduit resin-impregnated repair material. In this method, guiding means in the form of a guide tape or cord passes along and through the length of the un-inverted part of the everting form and its distal end is led out the end of the section of the pipe or conduit to be repaired. Tension applied to the distal end of the guiding means acts to guide the everting zone of the everting form through large, sharp directional and/or diameter changes or contorted, dislocated or constricted zones in the pipe or conduit. The use of the guiding means makes the method particularly suited to the installation of repairs in pipes and conduits of a sinuous or tortuous nature incorporating sharp, large directional changes or changes in diameter or alignment.

In the method taught by PCT Patent Application No. PCT/AU98/00988, the local attachment of the guiding means to the everting form and repair material is only frictional. In consequence, during negotiation by the everting zone of the everting form of large, sharp directional changes or misalignment of joints resulting in a reduction in cross-sectional area, relative movement can occur between the guiding means and everting form (and, as appropriate, the repair material) resulting in a retardation of the eversional progress of the everting form or repair material. The result may be a concertina-like bunching of the everting form or repair material within the conduit in a zone behind the everting zone if excessive tension is applied to the guiding means in an attempt to negotiate the feature causing retardation of eversional progress. Bunching may form, effectively, a tight-fitting plug which acts to completely arrest eversional progress. It has been found in practice that, if the guiding means are attached to the inner surface of the everting form and the repair material throughout the length of the everting form from its trailing or moving end to a point close to its everting zone, then their effectiveness in guiding the everting zone through large, sharp directional changes or changes in diameter in a pipe or conduit is substantially enhanced. Where the guiding means are attached to the inner surface of the everting form and repair material, the means of attachment must necessarily be able to be readily broken or ruptured to permit the separation of the two at the point of eversion.

Muller et al., U.S. Pat. No. 5,388,616 discloses an invertible liner for internal surfaces of fluid conveying pipes. An invertible tubular substrate of resin permeated fibrous material is covered by an impermeable tubular film, which is surrounded by an impermeable tubular calibrating element. One end of the substrate is inserted into a pipe for lining from the inside, and the substrate assembly is inverted into the pipe. The substrate is immediately adjacent to the internal surface of the pipe and surrounds the film. The calibrating element can be separated from the film and removed by means of a flexible cord. The resin then sets upon inversion and keeps the inverted substrate in contact with the internal surface of the pipe.

In GB 2188695, Steketee, Jr., discloses a process and apparatus for lining a pipe. The invention comprises a tubular member of polyvinyl chloride (PVC) or other semi-rigid plastic tubing having thermoplastic characteristics, which is reduced by subjecting it to heat, then flattening or folding. While in this state, the tubing is installed into a pipe. The tubular member is then expanded by applying a heated expanding force to its interior to line the pipe.

Lippiatt, GB2331793 discloses a method of lining a host pipe or conduit by eversion of a liner. The invention comprises a liner which is everted within the pipe. The liner is flattened or axially folded and carried on a tubular support. The tubular support is releasably bonded to the liner by a peelable adhesive at one or more circumferential locations on the liner. The liner can peel away from the tubular support, and come into contact with the wall of the pipe as the tubular support is pulled through the pipe. In none of the cited prior art is the problem of guiding the zone of eversion through large, sharp directional changes or changes in diameter or alignment.

SUMMARY OF INVENTION

The object of the present invention is to provide guiding means which is used to effectively guide the everting zone of the everting form and repair material through large, sharp directional changes in a pipe or conduit, and means of attaching the guiding means to the everting form and repair material allowing the guiding means to perform their intended function but which permit the ready separation of the guiding means from the everting form and repair material at the point of eversion.

According to the present invention, one or more pieces of suitably shaped fibrous, woven or knitted, sheet repair material in tubular form are impregnated with a settable resin and attached in appropriate positions to the inner surface of an everting form made from a suitable thin, soft, flexible, fluid-tight material or combination of materials. The means of attachment of the repair material to the everting form are such as to permit ready separation of the two following curing of the settable resin.

Guiding means or a guide in the form of a tape, cord, fabric tube or tubular web extends along and throughout the length of the un-everted part of the everting form and repair material, and is bonded or otherwise attached to the inner surface of the everting form. The everting form with repair material is rolled onto a drum rotationally supported within a pressurisable container and its free end is led out through, and sealingly clamped over, the open end of a delivery tube formed as an extension of the pressurisable container. An extension of the guiding means or guide is passed along and through the section of the pipe or conduit to be repaired and its distal end is led to a winch or other suitable means of applying tension to it. The end of the delivery tube is presented to the open end of the section of pipe or conduit to be repaired and fluid pressure is applied to the interior of the pressurisable container to induce progressive eversion of the everting form from the delivery tube and into the pipe or conduit, thereby carrying the repair material with it into the pipe or conduit.

Tension applied to the guiding means directly or by means of their extension acts to guide the everting zone of the everting form through large, sharp directional changes or changes in diameter in the pipe or conduit. When the everting form and repair material are fully everted into the pipe or conduit, fluid pressure within it is maintained in order to urge the repair material into intimate contact with the inner surface of the pipe or conduit and to maintain them so until completion of curing of the settable resin with which it is impregnated. A heated fluid can be passed through the interior of the everting form in order to accelerate curing of the resin. When the resin is properly cured, tension is applied to a retrieval tape passing along and through the everted length of the everting form and connected to its distal end. The tension acts to cause the everting form to de-evert, reversing its process of eversion until it is fully withdrawn from the pipe or conduit, the everting form peeling away from the cured repair material as the zone of de-eversion passes it, leaving the repair material in place securely bonded to the inner surface of the pipe or conduit.

The various aspects of the present invention will be more readily understood by reference to the following description of preferred embodiments given in relation to the accompanying drawings in which:

BRIEF DESCRIPTION OF DRAWINGS

FIG. 3 is a is a longitudinal cross-sectional view of a straight part of a pipe or conduit through which the everting form and repair material are being deployed using the first form of guiding means.

FIG. 4 is a transverse cross-sectional view of a straight part of a pipe or conduit through which the everting form and repair material are being deployed using the second form of guiding means.

FIG. 5 is a transverse cross-sectional view of a bend of a pipe or conduit through which the everting form and repair material are being deployed without use of guiding means.

FIG. 6 is a face view of a third form of guiding means.

FIG. 7 is a transverse cross-sectional view of a straight part of a pipe or conduit through which the everting form and repair material are being deployed using the guiding means depicted in FIG. 6.

DETAILED DESCRIPTION OF DRAWINGS

Figure 1:
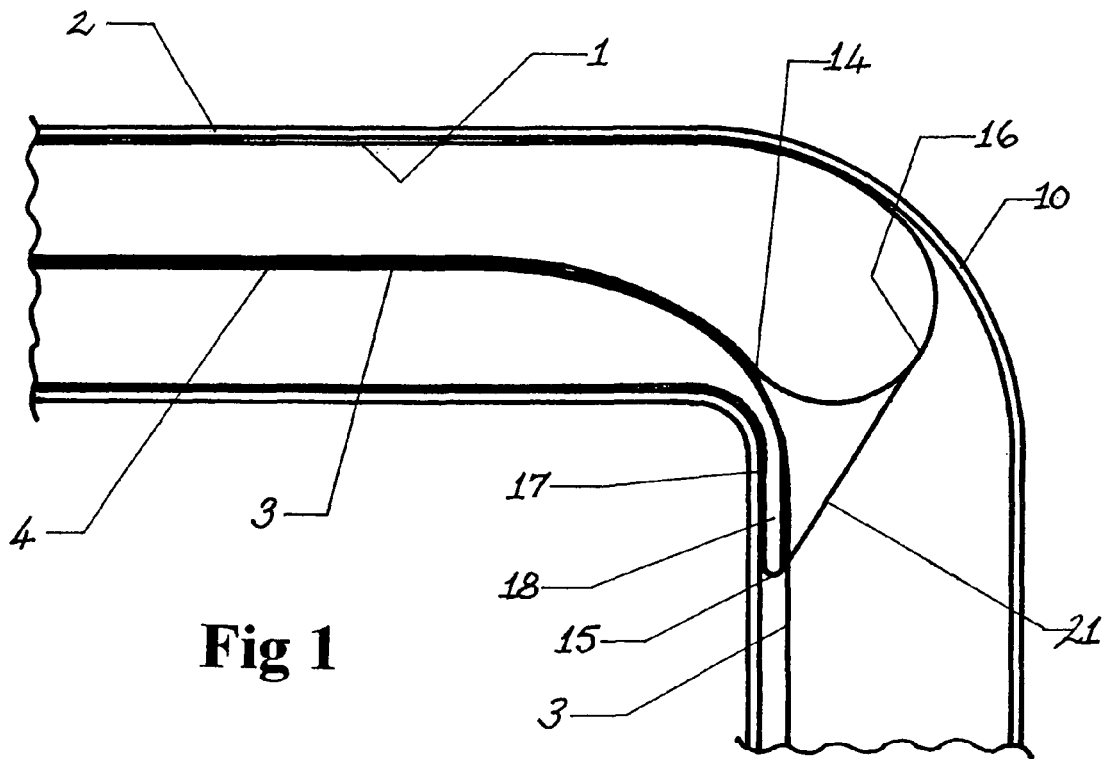
FIG. 1 is a longitudinal cross-sectional view of a bend of a pipe or conduit through which the everting form and the repair material are being deployed using a first form of guiding means.

With reference to FIG. 3, everting form 1 is depicted in the process of eversion into straight section 2 of a pipe or conduit. In all embodiments, the everting form is made from a suitable soft, flexible, pressure-tight, film material in continuous form and is fed out from and pressurised with a suitable fluid from a pressurisable container or launcher vessel as taught by PCT Patent Application No. PCT/AU98/00988. At its everting zone 29 immediately beyond eversion point 5, the everting form acts as a diaphragm and, with an effect analogous to a piston, exerts a force under the influence of the pressurising fluid to drive the everting zone of the everting form and the repair material along the pipe or conduit. At the everting zone, the repair material is carried or displaced from the interior of the everting form to its exterior, thereby bringing the repair material into position against the inner surface of the pipe of conduit. The everted part of the everting form is maintained fully inflated to retain the resin-impregnated repair material against the inner surface of the pipe or conduit until the settable resin is properly cured.

Guiding means or a guide in the form of tape, wire or cord 3 is releasably attached as appropriate to the inner surfaces of un-everted part 4 of the everting form and repair material 28, wherein the releasable attachment is not by friction alone. Tension applied to the guiding means or guide directly or through their extension (not shown) assists in guiding the zone of eversion of the everting form and repair material through large, sharp directional changes in the pipe or conduit. At eversion point 5, the guiding means or guide attached to the inner surfaces of the un-everted part 4 of the everting form and the repair material peels or tears away from the everting form and the repair material and becomes detached. In the preferred embodiment, the guiding means or guide is bonded to the inner surfaces of the un-everted part 4 of the everting form and repair material by means of a suitable adhesive. In its cured state, the adhesive provides high longitudinal shear attachment to the everting form and repair material, but low tear strength or resistance to peeling at the point of eversion. In the preferred embodiment, the adhesive is a room temperature-vulcanising silicone rubber sealing compound or a weak, latex or rubber-based contact adhesive in single application, both of which tear or peel easily away from the smooth surface of the everting form and repair material.

The adhesives are applied to the guiding means in a narrow, more or less continuous application or in discrete applications, closely-spaced in an axial sense. Care is taken to ensure that the guiding means and the adhesives do not mask or otherwise impede the subsequent process of impregnating the repair material with the settable resin. In an alternative embodiment used where the guiding means take the form of a flat tape, a double-sided adhesive tape is employed to attach the guiding means to the inner surfaces of the everting form and repair material. In further alternative embodiments, suitable mechanical means are employed to attach the guiding means to the inner surfaces of the everting form and repair material, the attachment means comprising stitching, tacking, stapling or frictional attachment elements providing high longitudinal shear, but rupturing or breaking readily at the point of eversion. In still another embodiment, the guiding means may be attached to the inner surfaces of the everting form and repair material by self-adhesive forms of the complementary parts of a hook and loop attachment system, such as Velcro®. In yet another embodiment, the guiding means are attached to the inner surfaces of the repair material by means of a self-adhesive form of the hook part of a hook and loop attachment system. The hook part is self-adhesively attached to the guiding means with its hooks engaging the soft surface of the repair material. One or both parts of the hook and loop attachment are attached to the guiding means and to the inner surfaces of the everting form and the repair material by stitching, sewing, tacking or stapling.

With reference to FIG. 4, guiding means in the form of a fabric tube or tubular web 6, 8 extend along and through the length of un-everted part 4 of everting form 1 and repair material 28 and are bonded or attached to the inner surfaces of the everting form and repair material in the same way as described in relation to FIG. 3. The diameter of the fabric tube or tubular web is preferably the same as the internal diameter of the inverting form and the repair material and preferably takes the form of a light, open-weave fabric of suitable tensile strength or what is commonly known as 'onion bag' material, a strong net material in which intersecting threads or filaments are fused or bonded to each other.

During eversion of the everting form and the repair material, tension applied to the extended part 7 of the guiding means acts to assist in drawing un-everted part 4 of the everting form and the repair material through the everted part 1 of the everting form. The guiding means detach from and peel away from the everting form and the repair material at point 9. The arrangement better distributes the drawing force applied to the everting form through the guiding means and, as described in relation to FIG. 2, provides better guidance of the everting zone through large, sharp directional changes in pipe or conduit 2 to be repaired.

With reference to FIG. 5, depicted are stages of the progressive eversion of everting form 1 with the repair material into bend 10 of pipe or conduit 2 without the use of guiding means. It can be seen that, at the stage of eversion depicted by the feature numbered 11, all parts of the everting form and repair material have progressed equally. However, at the stage of eversion depicted by the feature numbered 12, it can be seen that contact with the inner wall of bend 10, and thereby the development of frictional forces, has inhibited eversionary progress of the part of the everting form and the repair material abutting the bend. At the stage of eversion depicted by the feature numbered 13, the effect of wall contact has been accentuated, with a substantial collapsing of eversionary progress on the side of the everting form abutting the bend. Simultaneously, the most forward part of the eversion zone of the everting form and the repair material may, in fact be deflected towards the collapsing side, the effect being one of a capturing of the everting zone by the bend with a complete interruption of eversionary progress. Such effect renders necessary the use of the guiding means. It can be demonstrated that, in an everting form carrying with it repair material and without the provision of the guiding means, its zone of eversion is unlikely to negotiate a smooth bend with a large, sharp directional change exceeding approximately 45°. In contrast, the zone of eversion of the same the everting form and repair material, when the guiding means are employed, can be made to readily negotiate a smooth bend with a large, sharp directional change exceeding 180°.

With reference to FIG. 1, everting form 1 is depicted in the process of eversion through bend 10, guided by guiding means in the form of flat tape 3. The guiding means are bonded or attached to the inner surface of the everting form and the repair material in the same way as described in relation to FIG. 3. Tension applied to the guiding means substantially compresses the part 18 of the everting zone of the everting form and the repair material adjacent zone 17 at the inside of bend 10, allowing expansion of the part 16 of the everting zone adjacent the outside of the bend such that it substantially fills the lumen of the pipe or conduit, thereby facilitating its eversionary progress. At the stage of eversionary progress depicted, the everting zone has been stretched into a generally elliptical shape and the resultant tension generated across the major axis 21 of the everting zone acts to draw or urge part 16 around bend 10. Adhesion or attachment of the guiding means to the everting form and the repair material peels or tears away from the surface adjacent part 16 at point 14 and from the surface adjacent part 18 at point 15. The combined effect is such that eversionary negotiation of bend 10 by everting form 1 and the repair material is facilitated.

Figure 2:
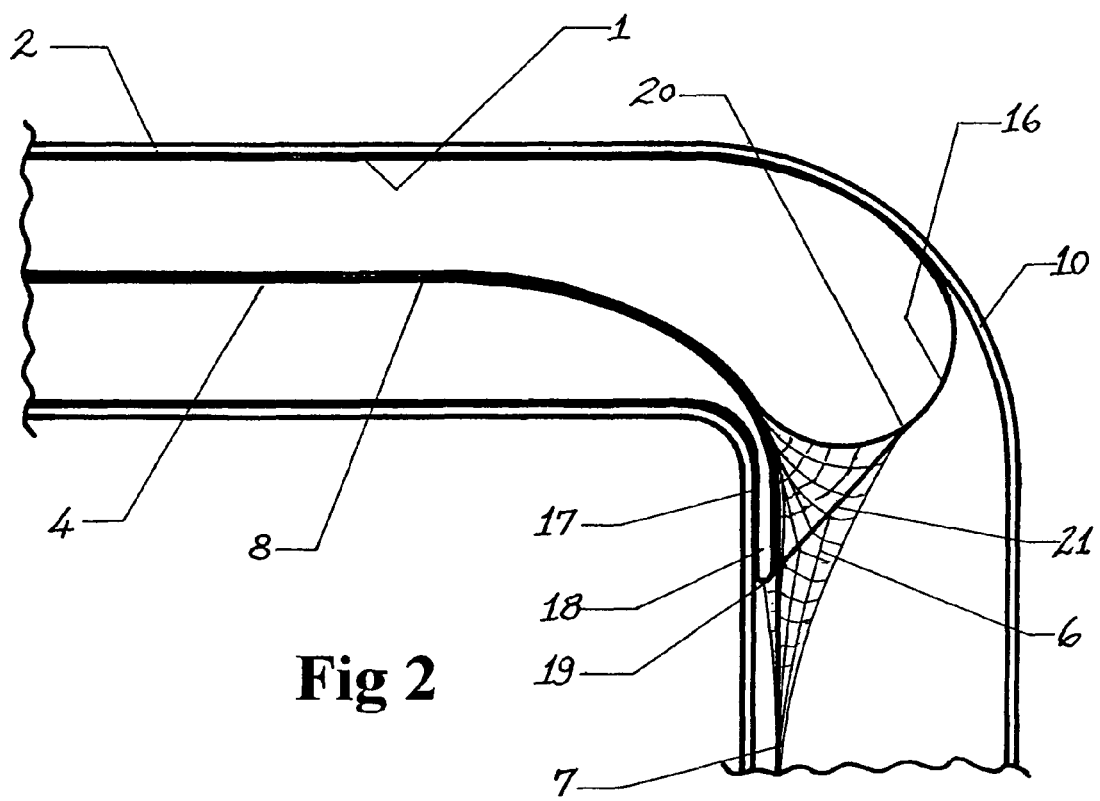
FIG. 2 is a longitudinal cross-sectional view of a bend of a pipe or conduit through which the everting form and the repair material are being deployed using a second form of guiding means.

With reference to FIG. 2, everting form 1 together with the repair material are depicted in the process of eversion through bend 10, guided by guiding means in the form of a fabric tube or tubular web 6, 8. The guiding means are bonded or attached to the inner surface of the everting form in the same way as described in relation to FIG. 3. Tension applied to the guiding means through their extension 7 substantially compresses the part 18 of the everting zone of the everting form and the repair material adjacent zone 17 at the inside of bend 10, allowing expansion of the part 16 of the everting zone adjacent the outside of the bend such that it substantially fills the lumen of the pipe or conduit, thereby facilitating its eversionary progress. At the stage of eversionary progress depicted, the everting zone has been stretched into a generally elliptical shape and the resultant tension generated across the major axis 21 of the everting zone acts to draw or urge part 16 around bend 10. At the same time, it is apparent that tension applied directly to part 16 of the everting zone by fabric tube or tubular web 6 acts to draw part 16 around bend 10. Adhesion or attachment of the guiding means to the everting form and the repair material peels or tears from the surface adjacent part 16 at point 20 and from the surface adjacent part 18 at point 19 and along the intermediate surfaces between points 19 and 20. The combined effect is such that eversionary negotiation of bend 10 by everting form 1 is more effectively facilitated.

With reference to FIGS. 6 and 7, one or more tape-type guiding means 26 are sewn or otherwise fastened into the everting form and the repair material prior to their closure into tubular form in preparation for their eversion into a pipe or conduit 2 being repaired. In the preferred embodiment, the guiding means are made from a suitable material combining high longitudinal shear strength with tearability. In the preferred embodiment, the material is a fibre-reinforced paper material which has been treated to prevent its being softened by contact with water or the settable resin. The guiding means pass along and through the full length of the interior of the everting form and the repair material and are sewn or bonded to it along typical lines 23. The repair material (not shown) is fixed and contained within the everting form and zones 22 of the guiding means are optionally sewn to it to secure it in place. An extension (not shown) is securely attached to the free end of the guiding means to allow tension to be applied to the guiding means for the purpose of guiding the everting zone of the everting form and the repair material. A more or less centrally-located longitudinal zone 25 of the guiding means is reinforced to substantially increase its tensile strength. In the preferred embodiment, the reinforcement takes the form of a lamination of a suitable scrim material. Narrow longitudinal zones 24 immediately adjacent the reinforced zone are weakened such that the two un-reinforced zones 22 of the guiding means readily tear away from the reinforced zone at the point of eversion of the everting form and the repair material. At the point of eversion, the un-reinforced zones tear away from the reinforced zone and, being attached to the everting form and, as appropriate, the repair material, are everted with them and carried into position against the inner surface of the pipe or conduit being repaired. The separated reinforced zone continues to extend beyond the point of eversion, carrying tension applied for the purpose of guiding the everting zone.

Where the guiding means take the form of the fabric tube or tubular web, the adhesives are preferably used in applications closely-spaced in an axial sense throughout the length of the everting form. The term closely spaced can be taken to mean applications spaced no further apart in an axial sense than 50 millimetres. In alternative embodiments, the applications of adhesive are separated in an axial sense by distances of up to 500 millimetres. Application of adhesive is readily achieved with the guiding means laid flat on a suitable surface and a suitable dispenser used to apply strip applications across the width of the guiding means and orientated more or less normal to their longitudinal axis.

Where all the forms of the guiding means pass over or across the repair material attached within the everting form, the guiding means are bonded to the repair material in the same way as to the everting form. During subsequent impregnation of the repair material with the settable resin, the guiding means do not inhibit access of the resin to the repair material. Where the guiding means take the form of a tape or cord or strip material as described in relation to FIGS. 6 and 7, the resin material is able to satisfactorily pass around or through the guiding means and effect proper impregnation of the repair material. Where the guiding means take the form of the fabric tube or tubular web, as described in relation to FIGS. 2 and 4, the resin material is able to satisfactorily pass between the warp and weft of the fabric or the threads or filaments of the 'onion bag' material of the guiding means and effect proper impregnation of the repair material.

Obviously, the guiding means may be attached to the everting form and to the repair material by any suitable adhesive or mechanical attachment means. The attachment means must accommodate forces applied in the axial direction of the everting form and the repair material, but permit ready separation or detachment of the guiding means from the everting form and the repair material by breaking, rupturing or a peeling action generated at the zone of eversion by tension applied to the guiding means as the zone of eversion is impelled forwardly by the fluid pressure applied to the interior of the everting form. Tension applied to the guiding means does not act to impel forwardly the zone of eversion, but serves to guide the zone of eversion through directional changes and discontinuities in the pipe or conduit and prevents localised axial differential movement between the everting form and the repair material immediately upstream of the zone of eversion while permitting the required freedom of differential movement between the everting form and the repair material in the immediate the eversion zone.

If the guiding means are not attached to the inner surface of the everting form and the repair material more or less continuously throughout its length, from its trailing or moving end to a point close to its everting zone, then tension applied to the guiding means may cause the trailing or moving end of the everting form and the repair material, to which the guiding means are attached, to travel along the pipe or conduit at a higher speed than the zone of eversion, thereby creating a localised bunching up of the everting form and the repair material. This effect is particularly evident where the everting form passes around a bend or deviation and, in smaller diameter pipes or conduits, may be sufficiently obstructive as to cause fluid pressure to be cut off from the zone of eversion. Where this occurs, further tension applied to the guiding means merely acts to exacerbate the bunching effect and obstruction.

In all cases herein, the term 'everting form' should be taken to mean, as appropriate, the combination of the everting form together with the resin-impregnated repair material carried with it. In the case where a long repair is to be installed in a pipe or conduit, it may, in fact, occupy almost the whole length of the everting form and the guiding means are attached to the repair material throughout its length in the manner described and to the everting form only at its closed end. In the case where a short repair is to be carried deep within a pipe or conduit from the point of entry on a proportionately much longer everting form, the guiding means are also attached as required to the everting form throughout its length and at its closed end. Where the everting form is made from very thin, soft, flexible film material and particularly where repairs are installed in pipes and conduits of larger diameter, the guiding means may be attached to the everting form at points substantially more widely separated than normal. The points of attachment of the guiding means to the everting form may be separated in an axial sense by as much as one to two metres or greater distances and, in some cases, it may only be necessary for the guiding means to be attached to the repair material in the way described and to the everting form only at its closed end. Where the everting form is made from thicker, less compliant film material and particularly where repairs are installed in pipes and conduits of smaller diameter, the guiding means must be attached to the repair material in the way described and to the everting form throughout its length at appropriately spaced points and at its closed end.

Where the repair material comprises several discrete layers of material and the guiding means are bonded to what may be termed the inner layer of the repair material prior to its eversion, tension applied to the guiding means may result in differential movement between the layers of the repair material. Where this may occur, the layers of the repair material are loosely connected by a suitable mechanical means which permit a degree of localised differential movement between the layers, but prevent gross differential movement. In the preferred embodiment, the mechanical connection means take the form of loose stitching, sewing, tacking or stapling.

The invention claimed is:

1. A method for guiding an everting form employed to carry repair material into a pipe or conduit, comprising:
    releasably attaching a tubular web of filamentary material within an interior surface of an everting form, wherein a repair material is releasably disposed on the interior surface of the everting form, and wherein the tubular web is releasably attached to a portion of the interior surface of the everting form and a portion of the repair material along the full length of the everting form when the everting form is un-everted;
    fixing a first end of the tubular web to a substantially closed end of the everting form;
    applying force to the tubular web during eversion of the everting foam to guide a zone of eversion of the everting form and the repair material through directional changes and discontinuities in the pipe or conduit, wherein the tubular web releases from the everting form and the repair material at the zone of eversion, wherein releasably attaching the tubular web to the everting form and the repair material prevents localized longitudinal differential movement between the tubular web, the everting form, and the repair material in the region of the zone of eversion, and wherein the tubular web opens at the zone of eversion and then closes after the zone of eversion;
    curing the repair material; and
    removing the everting form from the cured repair material.

2. The method of claim 1, wherein the tubular web is releasably attached to the portion of the interior surface of the everting form and the portion of the repair material by an adhesive providing high longitudinal shear attachment but low tear strength or resistance to peeling.

3. The method of claim 2, wherein the adhesive is a silicone rubber sealing compound.

4. The method of claim 2, wherein the adhesive is a weak latex or rubber-based contact adhesive.

5. The method of claim 1, wherein the tubular web is releasably attached to the portion of the interior surface of the everting form and the portion of the repair material by double-sided adhesive tape.

6. The method of claim 1, wherein the tubular web is releasably attached to the portion of the interior surface of the everting form and the portion of the repair material by self-adhesive forms of complementary parts of a hook and loop attachment system.

7. The method of claim 6, wherein one or both parts of the hook and loop attachment system are attached to the tubular web and to the everting form and the repair material by stitching, sewing, tacking, or stapling.

8. The method of claim 1, wherein the tubular web is releasably attached to the portion of the repair material by a self-adhesive form of a hook part of a hook and loop attachment system, the hook part being attached to the tubular web with its hooks engaging a soft surface of the portion of the repair material.

9. The method of claim 1, wherein the tubular web is continuously realeasably attached to the portion of the interior surface of the everting form and the portion of the repair material.

10. The method of claim 1, wherein releasably attaching the tubular web takes the form of one or more axially-arranged applications extending more or less continuously throughout the length of the tubular web and, in the case of releasably attaching using an adhesive, each of the one or more axially-arranged applications have a width less than one tenth of the circumference of the everting form.

11. The method of claim 1, wherein releasably attaching the tubular web takes the form of one or more axially arranged applications, each application comprising a plurality of discrete applications throughout the length of the tubular web and, in the case of releasably attaching using an adhesive, each of the one or more axially-arranged applications have a width less than one tenth of the circumference of the everting form.

12. The method of claim 11, wherein the discrete applications are separated axially by distances in the range of 25 to 200 millimeters.

13. The method of claim 11, wherein the discrete applications are separated axially by distances in the range of 200 to 400 millimeters.

* * * * *